United States Patent
Gao et al.

(10) Patent No.: US 9,882,973 B2
(45) Date of Patent: *Jan. 30, 2018

(54) BREADTH-FIRST RESOURCE ALLOCATION SYSTEM AND METHODS

(71) Applicant: JPMorgan Chase Bank, New York, NY (US)

(72) Inventors: Minlin Gao, Jersey City, NJ (US); Alexey V. Syomichev, Westport, CT (US); Aaron Bell, New York, NY (US); Libin Yang, Princeton, NJ (US); Jason K. S. Choy, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,259

(22) Filed: Nov. 22, 2016

(65) Prior Publication Data

US 2017/0078372 A1    Mar. 16, 2017

Related U.S. Application Data

(63) Continuation of application No. 14/740,430, filed on Jun. 16, 2015, now Pat. No. 9,537,790, which is a continuation of application No. 13/774,108, filed on Feb. 22, 2013, now Pat. No. 9,088,459.

(51) Int. Cl.
| | |
|---|---|
| *G06F 15/16* | (2006.01) |
| *H04L 29/08* | (2006.01) |
| *H04L 29/06* | (2006.01) |
| *H04L 12/24* | (2006.01) |
| *G06F 9/50* | (2006.01) |
| *H04L 12/911* | (2013.01) |

(52) U.S. Cl.
CPC .......... *H04L 67/101* (2013.01); *G06F 9/5016* (2013.01); *H04L 29/06* (2013.01); *H04L 29/08072* (2013.01); *H04L 41/0896* (2013.01); *H04L 47/70* (2013.01); *H04L 47/821* (2013.01); *H04L 67/1012* (2013.01); *H04L 67/1017* (2013.01)

(58) Field of Classification Search
CPC .......................... H04L 29/08072; H04L 29/06
USPC ................................ 709/203, 220, 224, 228
See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| 5,075,881 A | 12/1991 | Blomberg et al. |
| 5,313,616 A | 5/1994 | Cline et al. |
| 5,347,518 A | 9/1994 | Lee |

(Continued)

FOREIGN PATENT DOCUMENTS

WO    WO01/74043    10/2001

OTHER PUBLICATIONS

Graham Hamilton, ed, Sun Microsystems JavaBeans API Specification, pp. 54-82 (1997).

(Continued)

*Primary Examiner* — Khanh Dinh
(74) *Attorney, Agent, or Firm* — LeClairRyan, a Professional Corporation

(57) ABSTRACT

A computing environment adapted with a resource allocation policy, the resource allocation policy being configured to evenly distribute application instances to as many servers as possible.

17 Claims, 7 Drawing Sheets

(56) References Cited

U.S. PATENT DOCUMENTS

| | | | |
|---|---|---|---|
| 5,386,551 A | 1/1995 | Chikira et al. | |
| 5,446,895 A | 8/1995 | White et al. | |
| 5,539,885 A | 7/1996 | Ono et al. | |
| 5,549,117 A | 8/1996 | Tacklind et al. | |
| 5,563,998 A | 10/1996 | Yakish et al. | |
| 5,566,297 A | 10/1996 | Devarakonda | |
| 5,594,863 A | 1/1997 | Stiles | |
| 5,630,047 A | 5/1997 | Wang | |
| 5,630,069 A | 5/1997 | Flores et al. | |
| 5,655,074 A | 8/1997 | Rauscher | |
| 5,701,471 A | 12/1997 | Subramanyam | |
| 5,712,971 A | 1/1998 | Stanfill et al. | |
| 5,721,913 A | 2/1998 | Ackroff et al. | |
| 5,721,914 A | 2/1998 | De Vries | |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,828,883 A | 10/1998 | Hall | |
| 5,835,770 A | 11/1998 | Shum et al. | |
| 5,842,196 A | 11/1998 | Agarwal et al. | |
| 5,845,292 A | 12/1998 | Bohannon et al. | |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,995,965 A | 11/1999 | Experton | |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,167,534 A | 12/2000 | Straathof et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,269,479 B1 | 7/2001 | Puram | |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,363,499 B1 | 3/2002 | Delo et al. | |
| 6,363,524 B1 | 3/2002 | Loy | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,463,454 B1 | 10/2002 | Lumelksy et al. | |
| 6,466,980 B1 | 10/2002 | Lumelksy et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco, Jr. et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,626,953 B2 | 9/2003 | Johndrew et al. | |
| 6,629,266 B1 | 9/2003 | Harper et al. | |
| 6,820,088 B1 | 11/2004 | Hind et al. | |
| 6,826,745 B2 | 11/2004 | Coker et al. | |
| 6,920,467 B1 | 7/2005 | Yoshimoto | |
| 6,934,934 B1 | 8/2005 | Osborne, II et al. | |
| 8,060,885 B2 * | 11/2011 | Benedetti | G06F 9/4843 707/790 |
| 8,681,948 B2 * | 3/2014 | Albert | H04M 3/53366 379/68 |
| 8,731,981 B2 * | 5/2014 | Adams | G06Q 10/02 705/6 |
| 9,531,796 B2 * | 12/2016 | Desai | G06F 9/5083 |
| 2002/0004912 A1 | 1/2002 | Fung | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0162090 A1 | 10/2002 | Parnell et al. | |
| 2002/0165754 A1 | 11/2002 | Tang et al. | |
| 2003/0004848 A1 | 1/2003 | Hellerstein et al. | |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0065644 A1 | 4/2003 | Horman et al. | |
| 2003/0120539 A1 | 6/2003 | Kourium et al. | |
| 2003/0144868 A1 | 7/2003 | MacIntyre et al. | |
| 2003/0188290 A1 | 10/2003 | Corral | |
| 2003/0196190 A1 | 10/2003 | Ruffalo et al. | |
| 2003/0212518 A1 | 11/2003 | D'Allessandro et al. | |
| 2003/0225662 A1 | 12/2003 | Horan et al. | |
| 2003/0225663 A1 | 12/2003 | Horan et al. | |
| 2005/0071807 A1 | 3/2005 | Yanai | |
| 2007/0220586 A1 * | 9/2007 | Salazar | G06F 9/5066 726/1 |
| 2008/0082982 A1 * | 4/2008 | Benedetti | G06F 9/4843 718/104 |
| 2010/0150324 A1 * | 6/2010 | Albert | H04M 3/53366 379/88.22 |

OTHER PUBLICATIONS

IBM Corporation, Code Generation for Database Applications, IBM Tech. Disclosure Bulletin Mar. 1992 (Mar. 1992).

IBM Corporation, OS/2 EE Database Manager SQLJRA Remote Protocol, IBM Tech, Disclosure Bulletin Jan. 1993, pp. 33-36 (Apr. 1993).

J.P. Hudepohl et al., Integrating metrics and models for software risk assessment (Abstract), 7th Int'l Conf. Software Reliability Engineering, p. 93 (1996).

Len Reinhart, Liability management: A new tool for financial consultants, Financial Consultant (Fall/Winter 1996).

Mary Campione et al., Java Tutorial: A Short Course on the Basics, Ch. 5 (3d ed. 2000).

Norman E. Fenton et al., A Critique of Software Defect Prediction Models, IEEE Transactions Software Engineering, pp. 675-89 (Sep./Oct. 1999).

(56) References Cited

OTHER PUBLICATIONS

S.G. Linkman, Quantitative monitoring of software development by time-based and intercheckpoint monitoring (Abstract), Software Engineering j. pp. 43-49 (Jan. 1990).
Sanjay Mohapatra, et al, Defect Prevention through Defect Prediction: A Case Study of infosys (Abstract), IEEE Int'l Conf. Software Maintenance, p. 260 (2001).
Steve McConnell, Gauging Software Readiness with Defect Tracking, IEEE Software (May/Jun. 1997).
Sybase, Inc., Monitor Client Library 12.5 Programmers Guide (May 2001).
Tze-Jie Yu et al., An Analysis of Several Software Defect Models, IEEE Transactinos Software Engineering, pp. 1261-270 (Sep. 1988).
V. Basili et al., Understanding and predicting the proces of software maintenance releases (Abstract), 18th Int'l Conf. Software Engineering, p. 464 (1996).
Ytzhak Levendel, Reliability Analysis of Large Software Systems: Defect Data Modeling, IEEE Transactions Software Engineering, pp. 141-152 (Feb. 1990).
Alessandra Agostini et al., A light workflow management system using simple process models, Computer Supported Cooperative Work, pp. 335-363 (Nov. 2000).
Betwixt: Turning beans into XML, http://web.archive.org/web/20020620000410/http://jakarta.apache.org/commons/betwixt (last visited Nov. 13, 2005).
Claes Wohlin et al., Understanding the Sources of Software Defects: A Filtering Approach (Abstract), 8th Int'l Workshop on Program Comprehension, p. 9 (2000).
CSK Software AG, Business Process Automatin and Workflow in the Financial Industry (2003).
D.M. Hilbert et al., An approach to large-scale collection of application usage data over the internet (Abstract), Proc. Int'l Conf. Software Engineering, pp. 136-145 (1998).
David S. Lindsay, Software Evaluation, Tests, and Measurements (Abstract), in aCM Computing Rev. (J. E. Sammet, ed.), p. 519 (1981).
Dimitrious Georgakopoulos et al., An Overview of Workflow Management, From Process Modeling to Workflow Automation Infrastructure, Distributed . . . pp. 119-153 (1995).
Drake, E. Lundell, Jr., et al., Computer Use-an executive's guide (Abstract) in ACM Computing Rev. (M.A. Duggan ed), pp. 48-49 (1974).
Esmond PITT et al, java.rmi: The Remove Method Invocation Guide, Section 3.5 (2001).
ExoLab Group, Using Castor XML, http://web.archive.org/web/200108270422/http://www.castor.org/xml_framework html (last visited Nov. 11, 2005).

* cited by examiner

BREADTH-FIRST RESOURCE ALLOCATION SYSTEM AND METHODS

RELATED APPLICATIONS

This application is a continuation of U.S. application Ser. No. 14/740,430, filed Jun. 16, 2015, which is a continuation of U.S. patent application Ser. No. 13/774,108, filed on Feb. 22, 2013, now U.S. Pat. No. 9,088,459, entitled "BREADTH-FIRST RESOURCE ALLOCATION SYSTEM AND METHODS", the entire contents of which are incorporated herein by reference.

TECHNICAL FIELD

Embodiments of the invention relate generally to grid computing and, more specifically, to managing allocation of computer resources.

BACKGROUND

In grid computing scheduling software, different resource allocation policies may be employed. Two common resource allocation policies are often referred to as a "stacked" approach and a "balanced" approach.

When implementing a stacked resource allocation policy, for each allocation, servers are selected in the order in which they are listed in a resource group during initialization. CPU slots are allocated from one server until all the CPU slots on that server are used. When all the CPU slots on that server are used, the next server listed in the resource group is selected and CPU slots from that server are allocated until all the CPU slots on that server are used.

When implementing a balanced resource allocation policy, for each allocation, servers are selected from a resource group based on the number of free CPU slots available on those servers. Slots are allocated first from the server with the highest number of free CPU slots. When all the CPU slots on that server are allocated, CPU slots are allocated from the next server with the highest number of free CPU slots.

The weak point of the aforementioned allocation policies is that an allocation request may be fulfilled with CPU slots from a single server if the server selected has enough idle slots. In today's computing environments, servers come with many CPUs and it is not uncommon to see servers configured with up to fifty (50) CPU slots. As such, any one application having this many or less instances may be allocated to CPU slots all residing on the same server when one of the foregoing resource allocation policies is employed. If that server goes down, it may result in a total loss of service for an application as all its instances will be impacted. This presents a significant operational risk for a grid computing environment.

Accordingly, there is a need for an improved resource allocation policy that is tolerant of individual server failures.

SUMMARY OF THE INVENTION

The present invention is directed at a breadth-first resource allocation policy, the resource allocation policy embodied in the system and methods described in detail herein and configured to evenly distribute application instances to as many servers as possible, thereby allowing it to be tolerant of individual server failures.

In the present invention, a scheduler may be provided to receive resource requests associated with one or more instances of an application and evenly distribute all instances of an application to as many servers as possible, with a minimum of two servers being utilized. When one or more servers fail, the scheduler may be configured to automatically route all traffic to the remaining functional instance(s), while broken instance(s) are moved to new servers. This ensures uninterrupted service for the application in the event of one or more server failures.

Using the resource allocation policy of the present invention, failure of a server may only decrease the capacity of a service, which will be restored after middleware moves the broken instances to a new server. As such, any application with "N" number of running instances will be tolerant of "N−1" number of server failures. Absent the resource allocation policy of the present invention, failure of a single server may bring down an entire application, resulting in total loss of a service for a period of time until middleware detects the failure and moves the broken instances to a new server.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
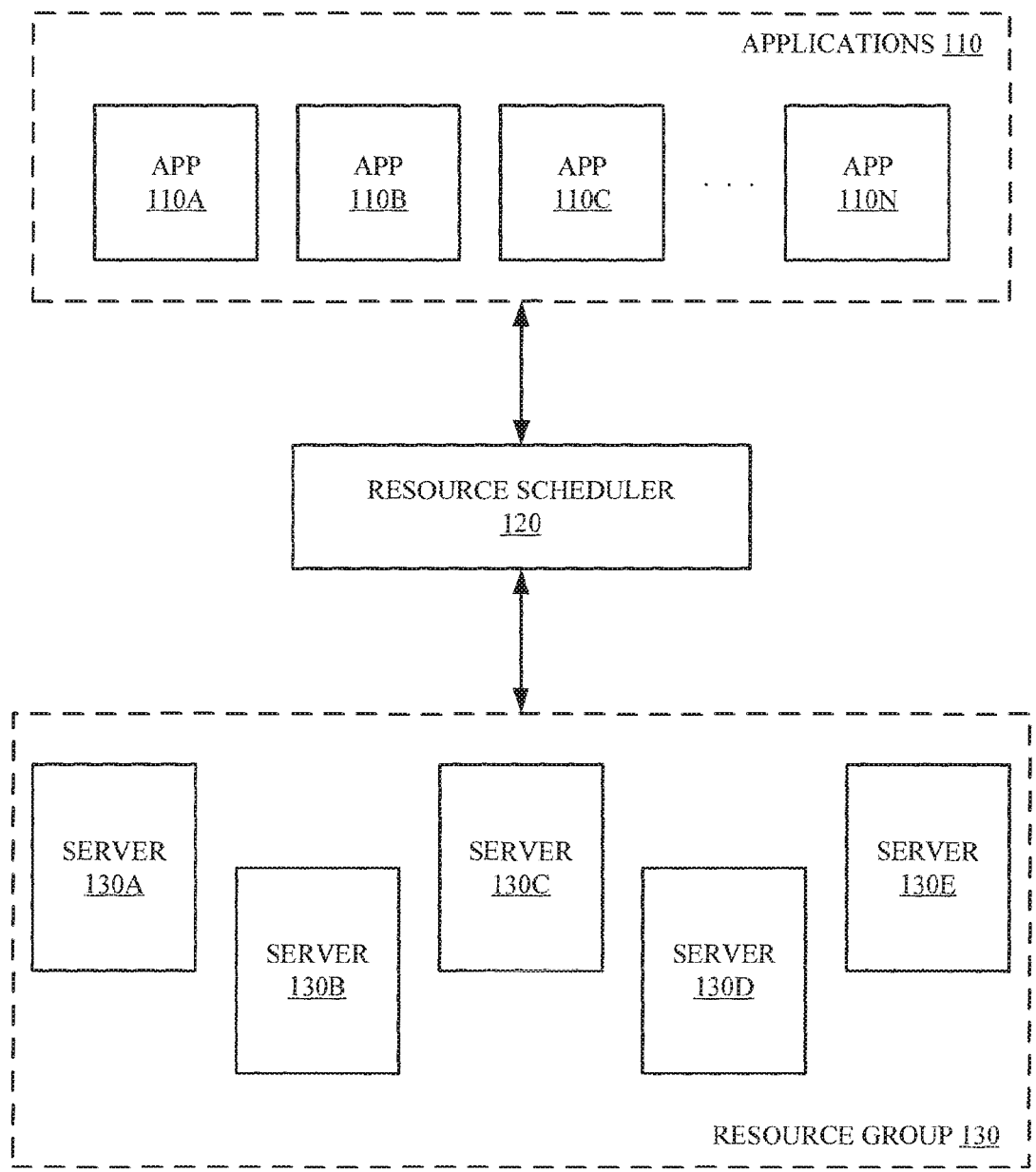
FIG. 1 is a block diagram illustrating an exemplary computer network in which embodiments of the present invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "identifying", "determining", "allocating", "monitoring", "detecting", "generating", "transmitting", "transferring", "executing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

FIG. 1 is a block diagram illustrating an exemplary system 100 in which embodiments of the present invention may operate. Referring to FIG. 1, system 100 may be comprised of a plurality of different applications 110A-110N, referred to herein collectively as applications 110, and a plurality of servers 130A-130E, referred to herein collectively as resource group 130. It should be noted that additional resource groups, spread over one or more locations, may be made available in accordance with embodiments of the present invention. However, for purposes of brevity and not by way of limitation, embodiments of the present invention are described herein with reference to the plurality of servers 130A-130E associated with resource group 130.

Figure 2:
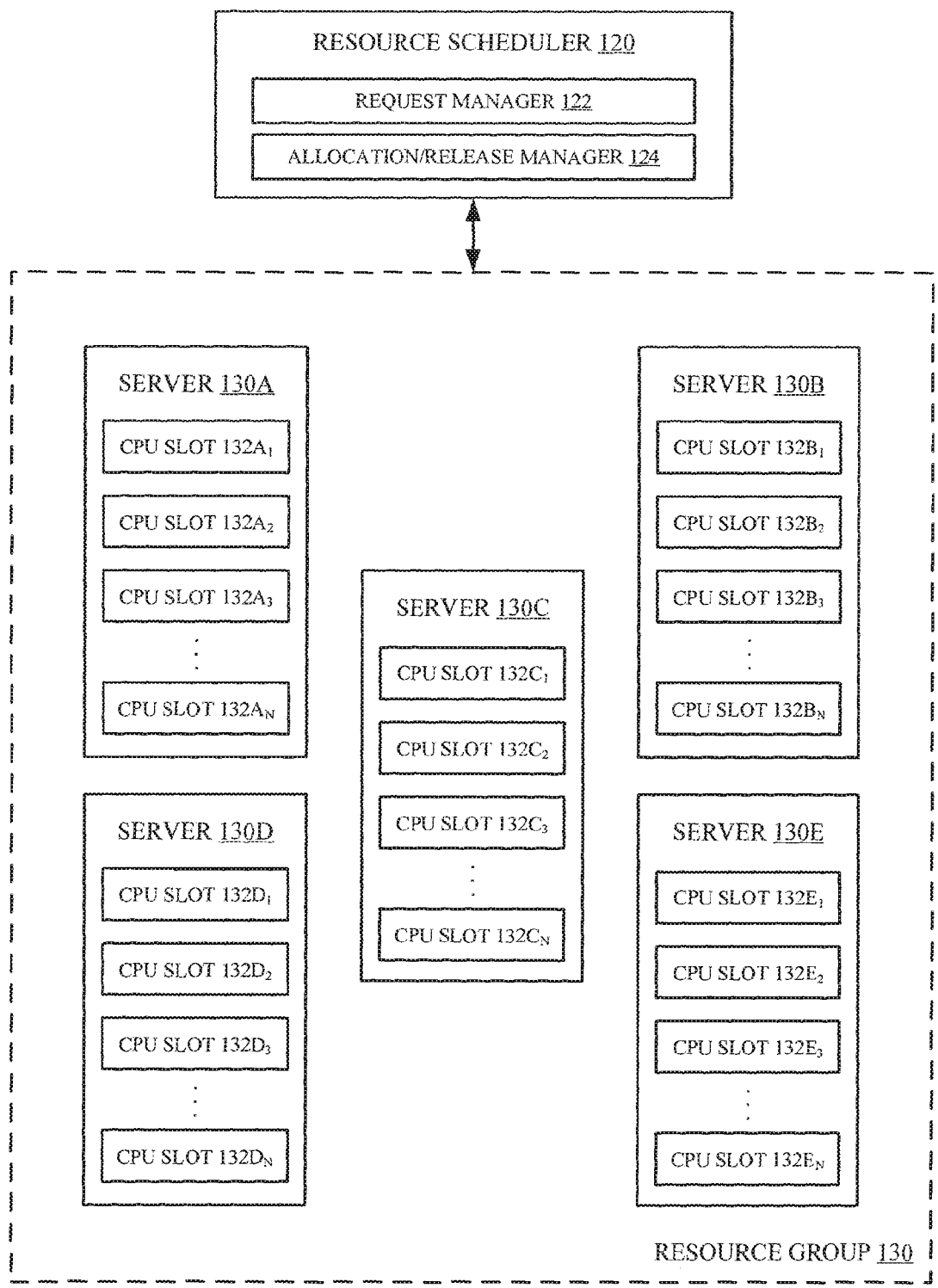
FIG. 2 is a block diagram illustrating components or modules of network elements illustrated in FIG. 1.

Applications 110 and servers 130A-130E in resource group 130 may be communicatively coupled via a resource scheduler 120, which may be further communicatively coupled to one or more computer processing and storage components (not shown). Referring to FIG. 2, resource scheduler 120 may be comprised of one or more modules for handling requests from applications 110, such as a request manager module 122 and an allocation/release manager module 124. Module 122 may be configured to receive allocation and release requests, and any corresponding requirements or parameters associated with the same, from applications 110. Module 124 may be configured to allocate or release CPU slots meet requests received from applications 110, wherein the manner in which CPU slots are allocated or released is determined in accordance with the resource allocation policy embodied in the present invention.

Referring to FIG. 2, servers 130A, 130B, 130C, 130D and 130E associated with resource group 130 may each be comprised, respectively, of a plurality of CPU slots $132A_1$-$132A_N$, $132B_1$-$132B_N$, $132C_1$-$132C_N$, $132D_1$-$132D_N$ and $132E_1$-$132E_N$ for dedicating resources to one or more instances of applications 110. The allocation or release (voluntarily or forcefully) of CPU slots may be made upon receiving a request for resources, at resource scheduler 120, associated with one or more instances of an application. A request may be generated for an application's initial request for CPU slots, for an application's request for expansion or release of CPU slots, for an application being preempted due to a required rebalancing of CPU slots or any other applicable resource request needed for running or terminating one or more instances of applications 110. To differentiate requests received from different applications, all requests associated with the same application may be assigned the same request ID.

An application can pass one or more parameters upon making a request for resources. In one embodiment, an application may identify a parameter associated with the minimum number of servers ($N_{min}$) it needs to run on, with a default value being no less than two (2) servers in accordance with the resource allocation policy of the present invention. An effective minimum number may be determined from the minimum of $N_{min}$, the total number of running instances of the application, and the total number of servers available in a pool (e.g., resource group 130). In another embodiment, an application may identify a parameter associated with a resource preference, wherein the resource preference may define sorting rules for scheduler 120 to take into consideration when sorting available resources in the pool, giving the application a choice to run preferred servers—e.g., servers with larger memory, servers with faster CPUs, servers with less running instances of other applications or any combination thereof.

In allocating CPU slots, scheduler 120 may sort servers per application allocation preference and allocate CPU slots one by one from servers in a round-robin fashion. This may ensure that CPU slots are allocated from as many servers as possible. Scheduler 120 may also take into consideration existing allocation preferences when dealing with requests from an application to expand CPU slots. This is to avoid allocating slots from the same server for two separate requests received from the same application—e.g., when an application initially requests one CPU slot and makes a subsequent separate request for allocation of an additional CPU slot. This will make sure that both instances of the application will not reside on the same server.

In releasing CPU slots, either due to an application shrinking or being reclaimed by another application, the CPU slots may be taken away in such a manner that allows for the remaining allocation of CPU slots for the application to still be spread on as many servers as possible. For example, an existing allocation comprising six (6) CPU slots may be allocated as follows: three (3) CPU slots from server 130A, two (2) CPU slots from server 130B and one (1) CPU slot from server 130C. If the existing allocation shrinks to five (5), then one (1) CPU slot may be released from server 130A. If the existing allocation shrinks to four (4), then another CPU slot may be released from server 130A or, alternatively, one (1) CPU slot may be released from server 130B. If the existing allocation shrinks to three (3), then one (1) CPU slot from each of server 130A, server 130B and server 130C will still be allocated to the remaining instances of the application. If the existing allocation shrinks to two (2), then one (1) CPU slot from at least two of the three previously designated servers 130A, 130B and 130C will still be allocated to the remaining instances of the application.

With applications 110 allocating and releasing CPU slots, it may become necessary to rebalance CPU slots allocated to an application. For example, there may be a situation where the number of servers with idle CPU slots is less then a predefined minimum number ($N_{min}$) of servers needed for an application. In this case, the resource allocation policy of the present invention may be configured to preempt one or more other applications to free one CPU slot (or more depending on the value of $N_{min}$) to meet the minimal requirement of a particular application. Applications to be preempted may be selected in such a way that after rebalancing of CPU slots instances of the preempted applications will still run on the same number (or more) of servers.

Figure 3:
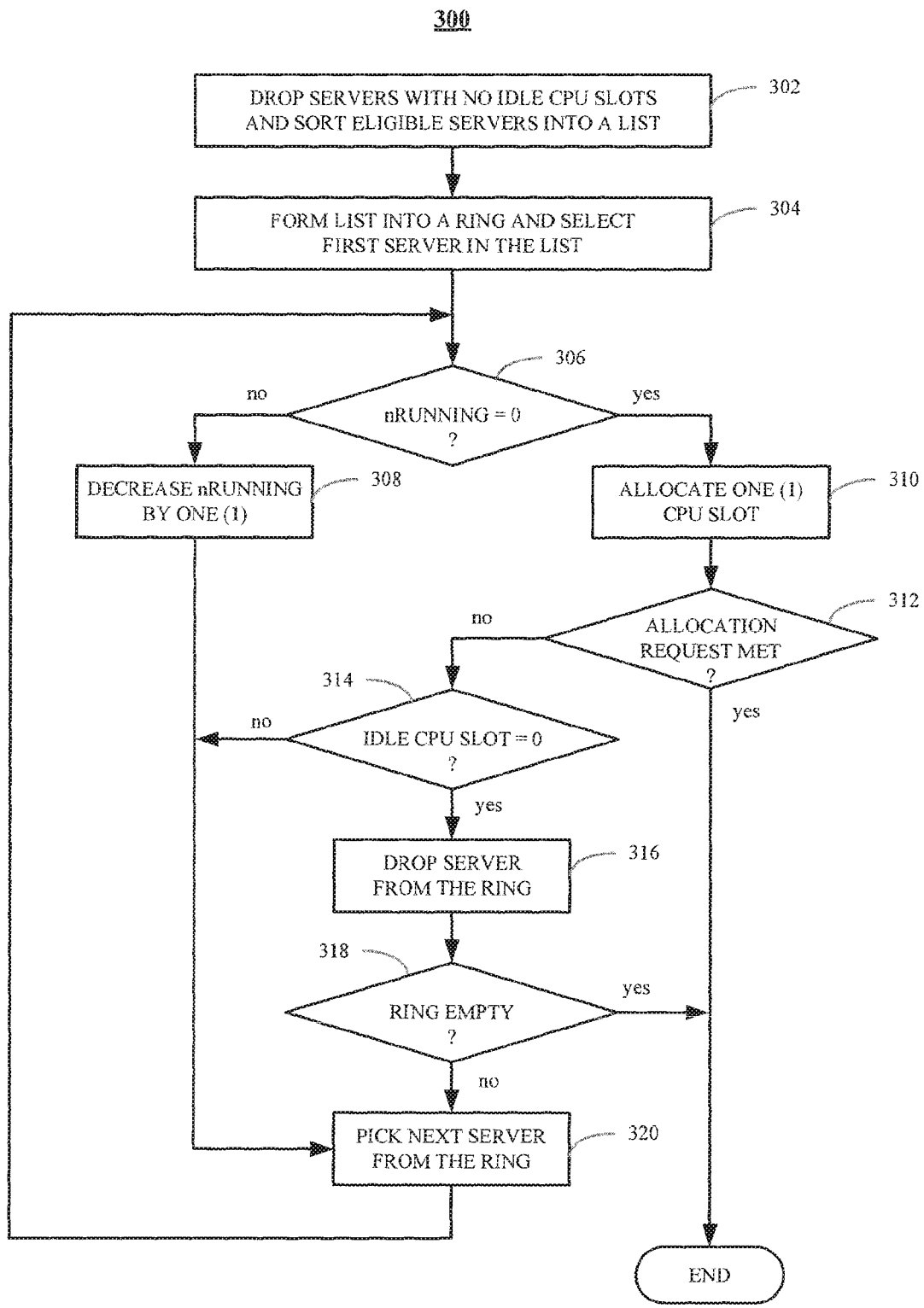
FIG. 3 is a flow diagram illustrating an embodiment of a method for allocating CPU slots.
Figure 4:
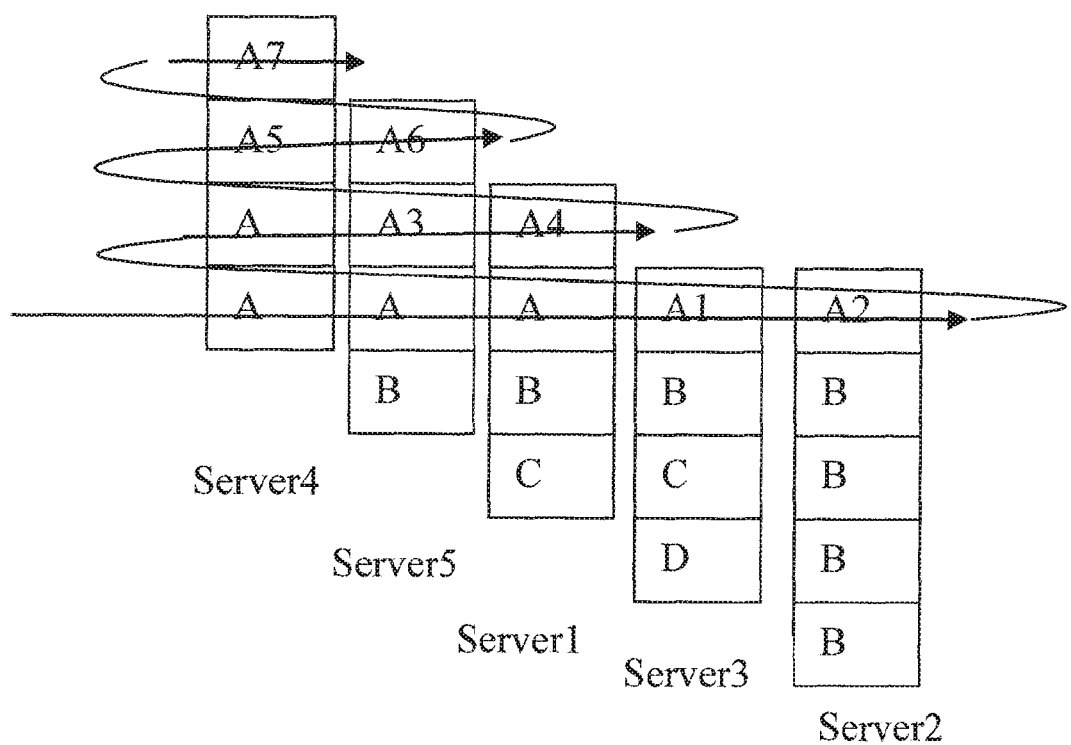
FIG. 4 is an illustrative representation of the allocation of CPU slots from a plurality of servers using the method illustrated in the flow diagram of FIG. 3.
Figure 5:
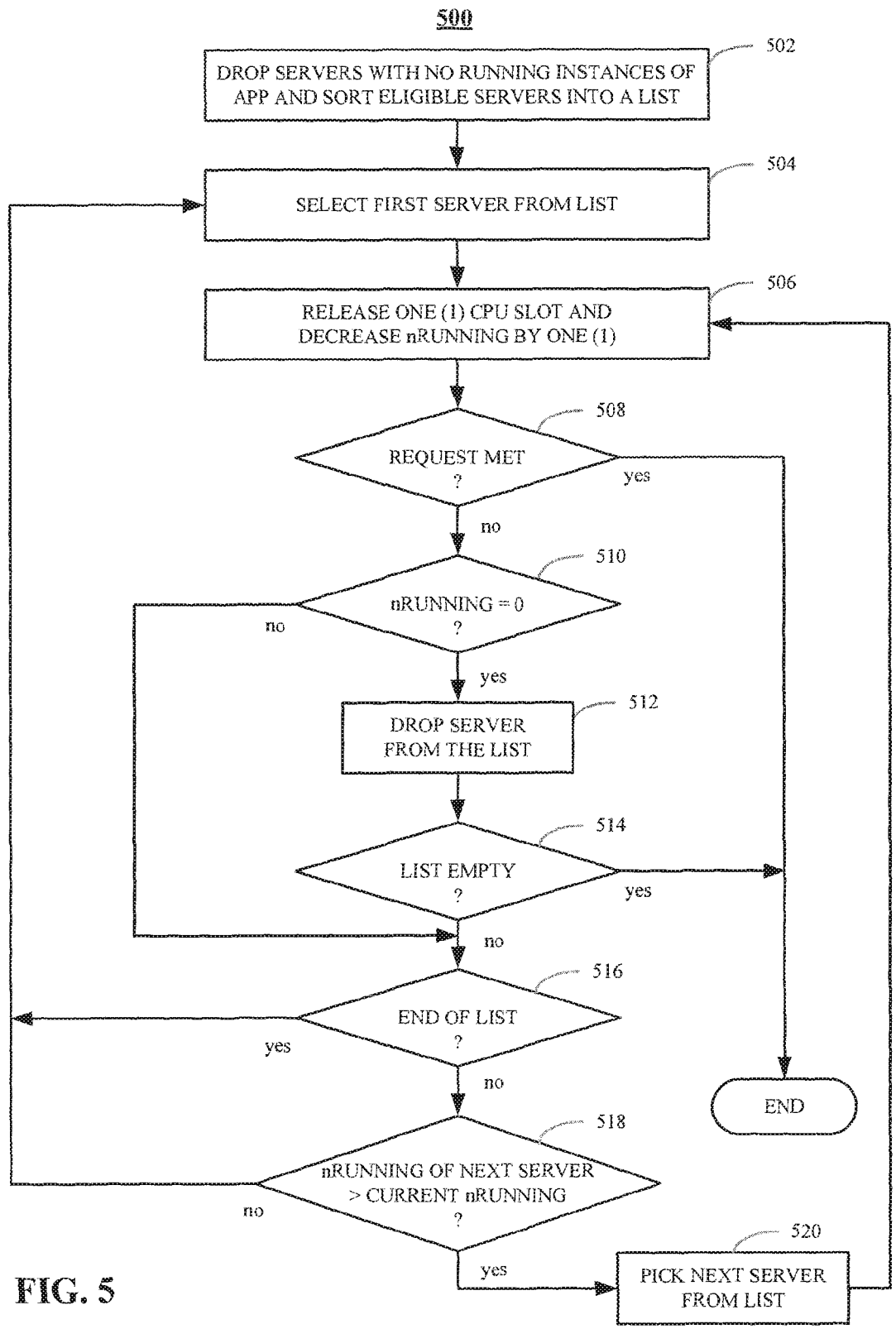
FIG. 5 is a flow diagram illustrating an embodiment of a method for releasing CPU slots.

Those skilled in the art will appreciate that scheduler 120 may be configured with more or less modules to enforce the breadth-first resource allocation policy embodied in the present invention, the methods of which are described herein with reference to FIGS. 3-6. As illustrated in FIG. 3 and FIG. 5, each of corresponding methods 300 and 500 may be performed by processing logic that may comprise hardware (e.g., circuitry, dedicated logic, programmable logic, microcode, etc.), software (such as instructions run on a processing device), or a combination thereof.

FIG. 3 is a flow diagram illustrating a method 300 for allocating CPU slots from servers in a pool (e.g., servers 130A-130E of resource group 130), according to an embodiment of the invention. Servers in the pool are configured with several attributes to enforce the breadth-first resource allocation policy embodied in the present invention. Servers may be configured, but are certainly not limited to, one or more of the following attributes: (i) nRunning; (ii) nIdle; (iii) nOtherRunning; (iv) nFreeMem; and (v) nCPUFactor.

The attribute "nRunning" represents the number of running instances on a server for an application. The attribute "nIdle" represents the number of idle CPU slots available on a server. The attribute "nOtherRunning" represents the number of running instances on a server for all other applications. The attribute "nFreeMem" represents the free memory of a server. The attribute "nCPUFactor" represents a CPU speed of a server. Other application defined attributes may be used for purposes of sorting servers.

Referring to FIG. 3, method 300 may be initiated upon receiving a request to allocate resources for an application. Upon receiving the request, method 300 may engage the resource allocation process and initially drop servers, at block 302, with no idle CPU slots (i.e., nIdle=0), since servers that do not have any idle CPU slots can not run any more instances of an application, and sort the remaining eligible servers in a list. In one embodiment, if the total number of remaining eligible servers is less than the effective Nmin associated with the application, CPU slots may be rebalanced to make enough servers available for the requested allocation.

The remaining eligible servers may be sorted into a list based on a combination of attributes. In one embodiment, eligible servers may first be sorted in descending order by the sum of the number of running instance of the application and the number of idle CPU slots available—i.e., sum (nRunning+nIdle). Sorting in this manner ensures that the final allocation will go to servers with the most idle slots first. For servers with the same sum (nRunning+nIdle), they may be sorted again in accordance with allocation preferences of the application. For example, allocation preferences of the application may require sorting in ascending order based on the number of running instances of all other applications on the servers (i.e., nOtherRunning) so that instances of the application will go to less busy servers. In another embodiment, the application may require sorting in descending order based on free memory of the servers (i.e., nFreeMem) so that instances of the application will go to servers with the most available memory first. In yet another embodiment, the application may require sorting in descending order based on CPU speed of the servers (i.e., nCPUFactor) so that instances of the application will go to servers with faster CPUs first The list of sorted eligible servers may then be formed into a ring, at block 304, and a first server is selected from the ring. Thereafter, a determination is made, at block 306, whether there are any running instances of the application (nRunning) on the selected server. If the selected server is already running at least one instance of the application (i.e., nRunning is a non-zero value), a CPU slot is not allocated from the selected server and the nRunning value associated with the selected server is decreased, at block 308, by one (1). The next server in the ring is selected, at block 320, and method 300 repeats again starting with determining, at block 306, if the next server has any running instances of the application.

If the selected server is not running an instance of the application (i.e, nRunning=0), one CPU slot is allocated, at block 310, from the selected server and the nIdle value associated with the selected server is decreased by one. A determination is then made, at block 312, whether the allocation request has been met. If the allocation request has been met, execution of method 300 is ended. If the allocation request has not yet been met, then another determination may be made, at block 314, whether by allocating the CPU slot, at block 310, the number of CPU slots available (nIdle) for the selected server becomes zero.

If nIdle does not become zero by making the allocation, then the next server in the ring is selected, at block 320. If nIdle becomes zero by making the allocation, then the selected server is dropped from the ring, at block 316, and a determination is made, at block 318, whether the ring is empty. If it is determined that the ring is not empty, then the next server in the ring is selected, at block 320. If it is determined that the ring is empty, then execution of method 300 is ended. In one embodiment, if execution of method 300 is ended without satisfying the allocation request of the application, one or more alternate resource groups, comprising a plurality of servers with available CPU slots, may be identified to reengage method 300 for meeting the allocation request of the application.

FIG. 4 is an illustrative representation of the allocation of CPU slots from a plurality of servers employing method 300 of FIG. 3. In the illustrative representation of FIG. 4, five (5) eligible servers are identified and may be sorted based on one or more attributes, as previously described. In the exemplary embodiment illustrated in FIG. 4, the five eligible servers are identified as Server1, Server2, Server3, Server4 and Server5.

Server1 comprises one (1) idle CPU slot and one (1) running instance of applications AppA, AppB and AppC. Server2 comprises one (1) idle CPU slot and four (4) running instance of application AppB. Server3 comprises one (1) idle CPU slot and one (1) running instance of applications AppB, AppC and AppD. Server4 comprises two (2) idle CPU slots and two (2) running instance of application AppA. Server5 comprises two (2) idle CPU slots and one (1) running instance of applications AppA and AppB. Running instances of applications AppA, AppB, AppC and AppD are identified in CPU slots of the eligible servers, respectively, by reference characters A, B, C and D. While reference characters A1-A7 represent a new allocation for AppA to be distributed over the eligible servers.

When a new allocation of resources is received for AppA, the eligible servers may be sorted as follows based on the foregoing attributes: Server4, Server5, Server1, Server 3 and Server2. Since Server4 has the highest sum of running instances of AppA and idle CPU slots (i.e., nRunning+nIdle=4) it is placed at the beginning of a list of eligible servers, followed by Server5 and Server1, each having the next highest sum of running instances of AppA and idle CPU slots (i.e., nRunning+nIdle=3 and nRunning+nIdle=2). As previously described, sorting in this manner ensures that the final allocation will go to servers with the most idle slots first. After Server1, Server3 may follow in the list, even though it has the same sum of running instances of AppA (i.e., nRunning=0) and idle CPU slots (i.e., nIdle=1) as Server2, because Server3 has less running instances of another application (i.e., AppB) than Server2, thereby allowing less busy servers to be allocated to.

Using method 300, the new allocation for AppA is distributed among the eligible servers in the list, with the first instance (A1) of AppA being received at a CPU slot on Server3 and the second instance (A2) of AppA being received at a CPU slot on Server2 (Server4, Server5 and Server1 already each have at least one running instance of AppA and would not satisfy the determination at block 306 of FIG. 3). After allocating an instance of AppA to a CPU slot on Server3 and on Server2, Server3 and Server2 are dropped from the list of eligible servers since they no longer have any remaining idle CPU slots (they would not satisfy the determination at block 314 of FIG. 3).

Thereafter, method 300 may return to the first server in the list of eligible servers, each of which has had their nRunning value decreased (at block 308 of FIG. 3) by a value of one (1) in the previous iteration. Accordingly, a CPU slot on Server5 and Server1 are allocated, respectively, with a third instance (A3) and fourth instance (A4) of AppA. After allocating an instance of AppA to a CPU slot on Server1, Server1 is dropped from the list of eligible servers since it no longer has any remaining idle CPU slots. Method 300 again may return to the first server in the list of eligible servers, each of which has had their nRunning value decreased by a value of one (1) in the previous iteration. In this iteration, a CPU slot on Server4 and Server5 are allocated, respectively, with a fifth instance (A5) and sixth instance (A6) of AppA. After allocating the sixth instance (A6) of AppA to a CPU slot on Server5, Server5 is dropped from the list of eligible servers since it no longer has any remaining idle CPU slots, and final instance (A7) of AppA is allocated to a CPU slot on remaining Server4.

FIG. 5 is a flow diagram illustrating a method 500 for releasing CPU slots from servers in a pool, according to an embodiment of the invention. Again, servers in the pool are configured with several attributes to enforce the breadth-first resource allocation policy embodied in the present invention. The attributes considered in releasing CPU slots from servers may comprise, but are certainly not limited to, nRunning, nIdle, nOtherRunning, nFreeMem and nCPUFactor (previously defined in conjunction with method 300 of FIG. 3).

Referring to FIG. 5, method 500 may be initiated upon receiving a request to release resources for an application. Upon receiving the request, servers with no running instances of the application (i.e., nRunning=0) may be dropped since there is nothing to be released from these servers and the remaining eligible servers may be sorted, at block 502, into a list.

In one embodiment, the remaining eligible servers may first be sorted in descending order by the number of running instances of the application (nRunning) on each of the remaining eligible servers. Sorting in this manner ensures that CPU slots will be released first from the servers with the most instances of the application. For servers with the same number of running instances of the application, they may be sorted again in accordance with allocation preferences of the application. For example, allocation preferences of the application may require sorting in ascending order by number of idle CPU slots available, and then sorting again in descending order by number of running instances of other applications, to release CPU slots from busier servers. In another embodiment, allocation preferences of the application may require sorting in ascending order based on free memory of a server (i.e., nFreeMem) to release CPU slots from servers with lower memory. In yet another embodiment, allocation preferences of the application may require sorting in ascending order based on CPU speeds of servers (i.e., nCPUFactor) to release CPU slots from servers with slower CPUs.

Starting at the beginning of the list of sorted eligible servers, a server is selected, at block 504. One (1) CPU slot is released from the selected server and the nRunning value for the selected server is decreased, at block 506, by one (1). After a CPU slot is released, a determination may be made, at block 508, whether the request has been met. If the request has been met, then execution of method 500 is ended. If the request has not yet been met, then another determination may be made, at block 510, whether release of the CPU slot, at block 506, results in the number of running instances of the application (nRunning) for the selected server becomes zero.

If nRunning is not zero after releasing the CPU slot for the selected server, method 500 proceeds to make a determination, at block 516, whether the end of the list has been reached. If the end of the list has not been reached, then a determination is made, at block 518, whether nRunning of the next server in the list is greater than the current nRunning value of the present selected server. If nRunning of the next server in the list is equal to or is less than nRunning of the present selected server, or the present selected server is the last server in the list, method 500 may return to the beginning of the list to select the first server, at block 504, and repeat the aforementioned release and determination process. If nRunning of the next server in the list is greater than nRunning of the present selected server, method 500 selects the next server, at block 520, and repeats, starting at block 506, the aforementioned release and determination process.

If nRunning is zero after releasing a CPU slot for a selected server, then the selected server is dropped from the list, at block 512, and a determination is made, at block 514, whether the list is empty. If it is determined that the list is empty, then execution of method 500 is ended. If it is determined that the list is not empty, then method 500 proceeds to make a determination, at block 516, whether the end of the list has been reached. If the end of the list has not been reached, then a determination is made, at block 518, whether nRunning of the next server in the list is greater than the current nRunning value of the present selected server. Method 500 may continue until determinations are made that the request has been met or the list of eligible servers is empty, respectively, at blocks 508 or 514.

Figure 6:
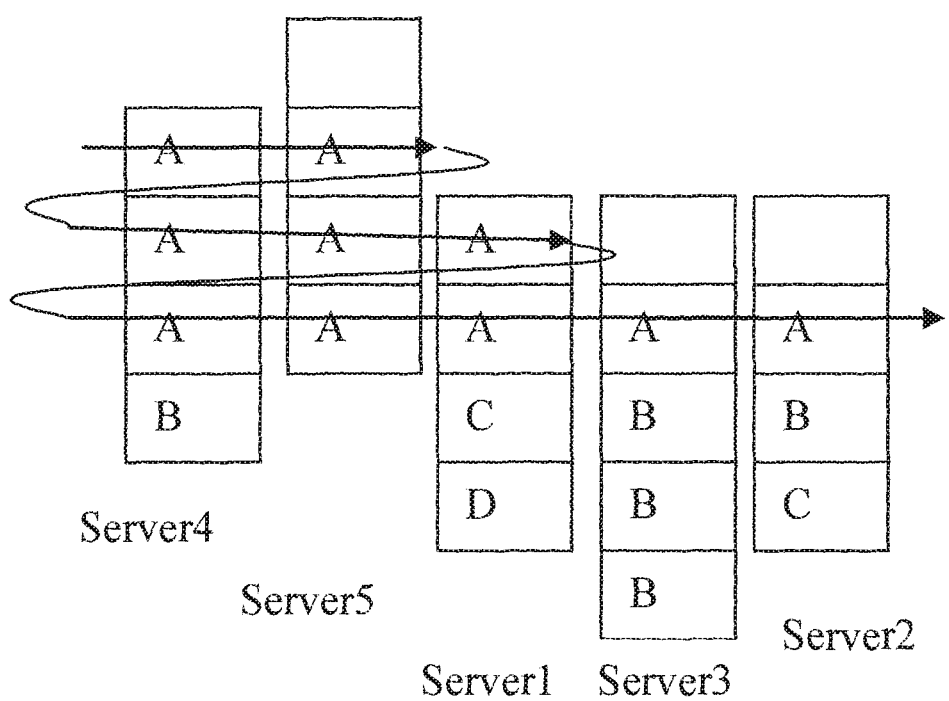
FIG. 6 is an illustrative representation of the release of CPU slots from a plurality of servers using the method illustrated in the flow diagram of FIG. 5.

FIG. 6 is an illustrative representation of the release of CPU slots from a plurality of servers employing method 500 of FIG. 5. In the illustrative representation of FIG. 6, five (5) eligible servers are identified and may be sorted based on one or more attributes, as previously described. In the exemplary embodiment illustrated in FIG. 5, the five eligible servers are identified as Server1, Server2, Server3, Server4 and Server5.

Server1 comprises two (2) running instances of application AppA and one (1) running instance of applications AppC and AppD. Server2 comprises one (1) idle CPU slot and one (1) running instance of applications AppA, AppB and AppC. Server3 comprises one (1) idle CPU slot, one (1) running instance of application AppA and three (3) running instance of application AppB. Server4 comprises three (3) running instances of application AppA and one (1) running instance of application AppB. Server5 comprises one (1) idle CPU slot and three (3) running instances of application AppA. Running instances of applications AppA, AppB, AppC and AppD are identified in CPU slots of the eligible servers, respectively, by reference characters A, B, C and D.

When a request to release resources is received for AppA, the eligible servers may be sorted as follows based on the foregoing attributes: Server4, Server5, Server1, Server 3 and Server2. Since Server4 and Server5 have the highest running instances of AppA (i.e., nRunning=3) they are placed at the beginning of a list of eligible servers, but Server4 may be placed ahead of Server5 in the list because it has no idle CPU slots (i.e., nIdle=0) and, as such, is identified as a busier server. Server1 may be next in the list because it has less running instances of application AppA than Server4 and Server5, but more than Server3 and Server2. After Server1, Server3 may follow in the list, even though it has the same running instances of application AppA as Server2, because Server3 has more running instances of another application (i.e., AppB) than Server2.

Using method 500, running instances of AppA are released from eligible servers in the list, with the first CPU slot being released from Server4 and the next being released from Server5. After releasing a CPU slot from Server4 and Server5, method 500 may return to the first server in the list (i.e., Server4) since the next server in the list (i.e., Server1) has an nRunning value equal to the current nRunning value of the present selected server (i.e., Server5). As previously described, when the nRunning value of the next server in the list is determined to be equal to or less than the current nRunning value of the present selected server, method 500 may return to the first server in the list so that CPU slots will be released first from the servers with the most instances of the application.

Figure 7:
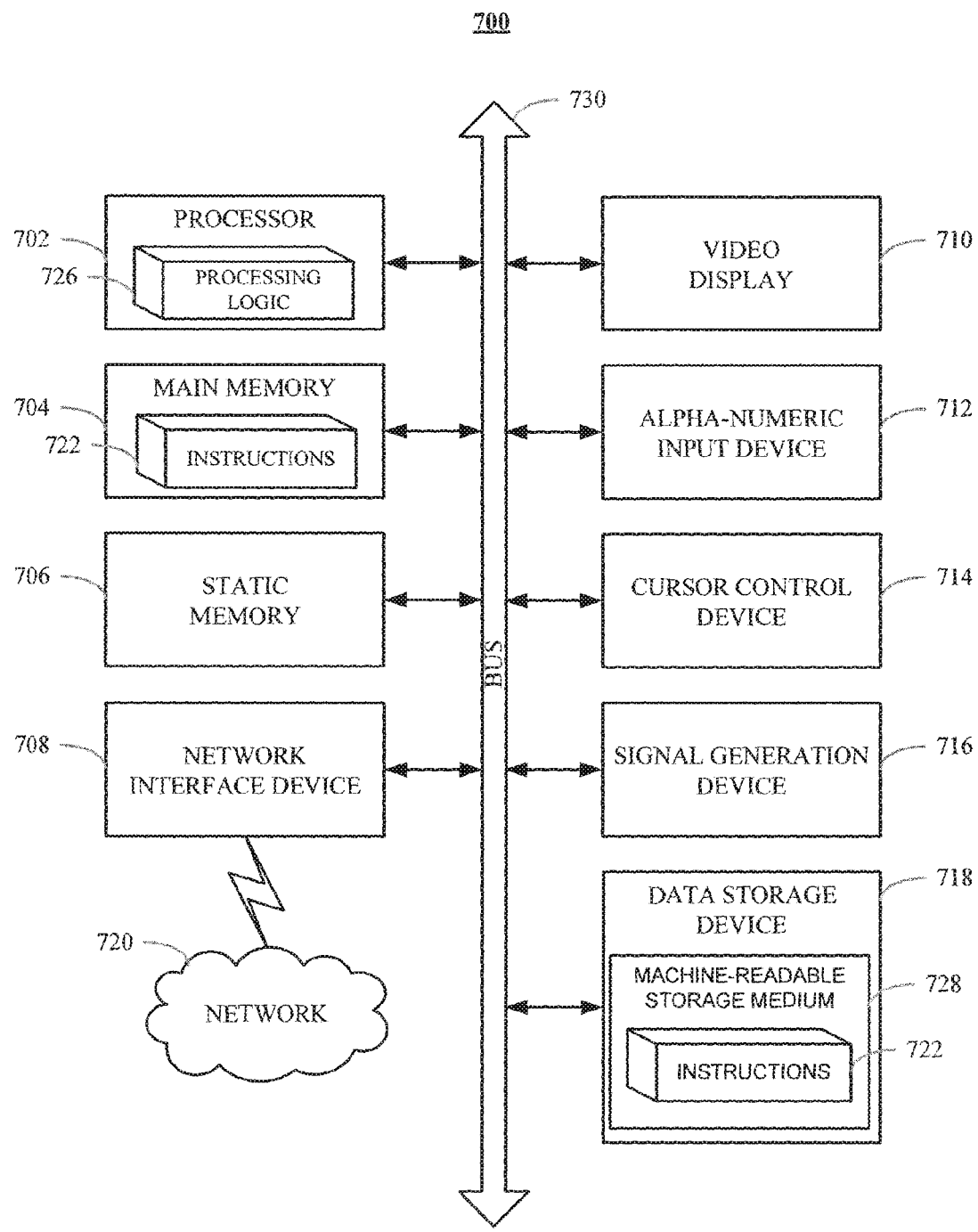
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 may be comprised of a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute processing logic 726 for performing the operations and steps discussed herein.

Computer system 700 may further include a network interface device 708. Computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

Data storage device 718 may include a machine-readable storage medium (or more specifically a computer-readable storage medium) 728 having one or more sets of instructions (e.g., software 722) embodying any one or more of the methodologies of functions described herein. For example, software 722 may store instructions for allocating resources. Software 722 may also reside, completely or at least partially, within main memory 704 and/or within processing device 702 during execution thereof by computer system 700; main memory 704 and processing device 702 also constituting machine-readable storage media. Software 722 may further be transmitted or received over a network 720 via network interface device 708.

Machine-readable storage medium 728 may also be used to store instructions to conduct allocation of resources. While machine-readable storage medium 728 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method that manages allocation of computer resources, the method comprising:
    storing in at least one non-transitory computer memory, data and instructions pertaining to computer resources in a computer network;
    accessing the at least one computer memory by a computer processor to execute instructions stored at said non-transitory computer memory, and to perform steps including:
        receiving a request from an application to allocate CPU slots, said request associated with multiple instances of the application;
        identifying one or more parameters of the application, wherein the one or more parameters are used in sorting the servers and wherein a parameter defines a minimum number of servers the application runs on, the minimum number of servers being at least two;
        assigning an identifier to the request, wherein all requests associated with the application receive the same identifier;
        identifying a resource group comprising at least two servers having idle CPU slots;
        evenly scheduling distribution of the instances of the application on the at least two servers in the resource group; and
        releasing the CPU slots in accordance with the evenly scheduled distribution.

2. The method of claim 1, further comprising determining a value representative of the number of running instances of the application on each server in the resource group.

3. The method of claim 2, further comprising determining a value representative of the free memory on each server in the resource group.

4. The method of claim 3, further comprising sorting servers in the resource group in an order, excluding servers with no free memory, by the amount of free memory of the servers.

5. The method of claim 4, further comprising allocating one CPU slot at a time from the list of eligible servers sorted in an order in a round-robin fashion.

6. The method of claim 1, wherein a parameter defines a preferred server type, the preferred server type being a server with larger memory capacities, a server with faster CPU speeds or a server with less running instances of another application.

7. The method of claim 1, further comprising determining whether rebalancing of CPU slots between servers in the resource group is required to satisfy a parameter of the application.

8. The method of claim 7, wherein rebalancing CPU slots between servers in the resource group increases the number of available servers with idle CPU slots.

9. A computer system that manages allocation of computer resources, comprising:
    at least one non-transitory storage device storing data and instructions; and
    at least one computer processor accessing the data and instructions stored at said non-transitory storage device, and executing instructions that perform steps including:
        receiving a request from an application to allocate CPU slots, said request associated with multiple instances of the application;
        identifying one or more parameters of the application, wherein the one or more parameters are used in sorting the servers and wherein a parameter defines a minimum number of servers the application runs on, the minimum number of servers being at least two;
        assigning an identifier to the request, wherein all requests associated with the application receive the same identifier;
        identifying a resource group comprising at least two servers having idle CPU slots;
        evenly scheduling distribution of the instances of the application on the at least two servers in the resource group; and
        releasing the CPU slots in accordance with the evenly scheduled distribution.

10. The system of claim 9, further comprising determining a value representative of the number of running instances of the application on each server in the resource group.

11. The system of claim 10, further comprising determining a value representative of the free memory on each server in the resource group.

12. The system of claim 11, further comprising sorting servers in the resource group in an order, excluding servers with no free memory, by the amount of free memory of the servers.

13. The system of claim 12, further comprising allocating one CPU slot at a time from the list of eligible servers sorted in an order in a round-robin fashion.

14. The system of claim 9, wherein a parameter defines a preferred server type, the preferred server type being a server with larger memory capacities, a server with faster CPU speeds or a server with less running instances of another application.

15. The system of claim 9, further comprising determining whether rebalancing of CPU slots between servers in the resource group is required to satisfy a parameter of the application.

16. The system of claim 15, wherein rebalancing CPU slots between servers in the resource group increases the number of available servers with idle CPU slots.

17. A non-transitory computer-readable storage medium programmed to include instructions that, when executed by a processing device, cause the processing device to perform a method, said method comprising:
- receiving a request to release CPU slots, said request associated with one or more instances of an application;
- receiving a request from an application to allocate CPU slots, said request associated with multiple instances of the application;
- identifying one or more parameters of the application, wherein the one or more parameters are used in sorting the servers and wherein a parameter defines a minimum number of servers the application runs on, the minimum number of servers being at least two;
- assigning an identifier to the request, wherein all requests associated with the application receive the same identifier;
- identifying a resource group comprising at least two servers having idle CPU slots;
- evenly scheduling distribution of the instances of the application on the at least two servers in the resource group; and
- releasing the CPU slots in accordance with the evenly scheduled distribution.

* * * * *